United States Patent [19]

Dawson

[11] 4,189,640
[45] Feb. 19, 1980

[54] QUADRUPOLE MASS SPECTROMETER

[75] Inventor: Peter H. Dawson, Ottawa, Canada

[73] Assignee: Canadian Patents and Development Limited, Ottawa, Canada

[21] Appl. No.: 964,059

[22] Filed: Nov. 27, 1978

[51] Int. Cl.$^2$ .................. B01D 59/44; H01J 39/00
[52] U.S. Cl. .................... 250/290; 250/305; 250/396 ML
[58] Field of Search ............ 250/396 ML, 290, 291, 250/305

[56] References Cited

U.S. PATENT DOCUMENTS

| | | | |
|---|---|---|---|
| 3,617,736 | 11/1971 | Barnett | 250/290 |
| 3,710,103 | 1/1973 | Helmer | 250/305 |
| 3,784,814 | 1/1974 | Sakai et al. | 250/290 |
| 4,146,787 | 3/1979 | Fite | 250/305 |

Primary Examiner—Harold A. Dixon
Attorney, Agent, or Firm—Edward Rymek

[57] ABSTRACT

The quadrupole mass spectrometer has four conventional rod-shaped poles symmetrically located about the ion injection axis. Opposite pairs of rods are interconnected and connected to an rf voltage source. A shield having a circular aperture is located at the output end of the rods to assure the stoppage of low mass particles. In addition, a stopping element also preferably circular is located on the axis at the output to assure the stoppage of heavy particles. A pair of grids incorporating the stopping element, are sequentially located at the output, normal to the axis, the first is connected to a dc voltage source to accelerate the remaining particles through the fringing field of the quadrupole and the second is connected to a dc voltage source to subsequently decelerate the particles.

5 Claims, 3 Drawing Figures 4,189,640

QUADRUPOLE MASS SPECTROMETER

BACKGROUND OF THE INVENTION

This invention is directed to a quadrupole mass spectrometer and in particular to a quadrupole mass spectrometer having accelerating and decelerating grids at its output.

Mass spectrometers are in widespread use for gas analysis, particularly in combination with gas chromatographs for analysis of complex mixtures in the fields of organic chemistry, biochemical and biomedical analysis. Existing mass spectrometers particularly of the quadrupole mass spectrometer type have been dominant in relation to the above problems for the past few years because of some inherent advantages in design, particularly in relation to automated systems.

Present limitations to performance (sensitivity and resolution) of quadrupole mass spectrometers are set by the high mechanical precision required in the four-rod structure and by a limit to resolution due to the number of rf cycles the ions must spend in passing through the device. This depends on the ion energy but the latter cannot be lowered beyond a certain limit owing to deleterious effects of the dc fringing fields at the entrance, especially for high mass ions. Cost limitations are set by the complex precision circuitry required, especially for the exact control ($<1$ part in $10^5$) of the rf/dc voltage ratio. A modification in the operating method for the mass filter was reported by U. Brinkmann in the International Journal of Mass Spectrometry Ion Physics 9 (1972) 161 and has been under investigation as reported by A. E. Holme et al in the publication International Journal of Mass Spectrometry and Ion Physics, 26(1978) pp 191–204. These devices operate with only an rf applied to the rod so that the electronic circuitry is much simpler. The mass separation depends upon the fact that ions whose trajectories are marginally stable with the particular applied rf voltage emerge with excess kinetic energies. This is probably partly due to an interplay between ion trajectories in the device and fringing fields at the ion exit. The length limitations to resolution no longer apply. The device geometry (mechanical tolerances) will be much less critical. The acceptance of ions should be much larger and fringing fields less important. Though promising results have been reported, there are two critical disadvantages. There can be a background signal due to higher mass ions or even high velocity ions which pass directly through the device near the central axis and are measured, and the system cannot include an electron multiplier detector with its important advantage of higher signal output levels and faster useful scan rates.

SUMMARY OF THE INVENTION

It is therefore an object of this invention to provide a quadrupole mass spectrometer capable of accepting ions from a large range of initial displacements and/or angles of emission.

It is a further object of this invention to provide a quadrupole mass spectrometer in which performance is less critically dependent on the perfection of the quadrupole geometry.

It is another object of this invention to provide a quadrupole mass spectrometer which operates efficiently at high masses.

These and other objects are achieved in a quadrupole mass spectrometer having four rod shaped poles positioned symmetrically about a charged particle injection axis whereby charged particles are injected into one end and exit the other end, the opposite pairs of poles being interconnected for connection across an rf voltage source. The spectrometer further including first and second grids in spaced sequence at the output end of the quadrupoles, the first grid being connected to a first dc voltage source to accelerate the charged particles traversing the quadrupoles exit fringing field and the second grid being connected to a second dc voltage to decelerate the charged particles traversing the first grid. The spectrometer further includes a mass of material located at the output end of the quadrupoles on the charge particle axis, preferably attached to one of the grids, for stopping particles travelling along the axis.

DESCRIPTION OF THE PREFERRED EMBODIMENTS

Figure 1:
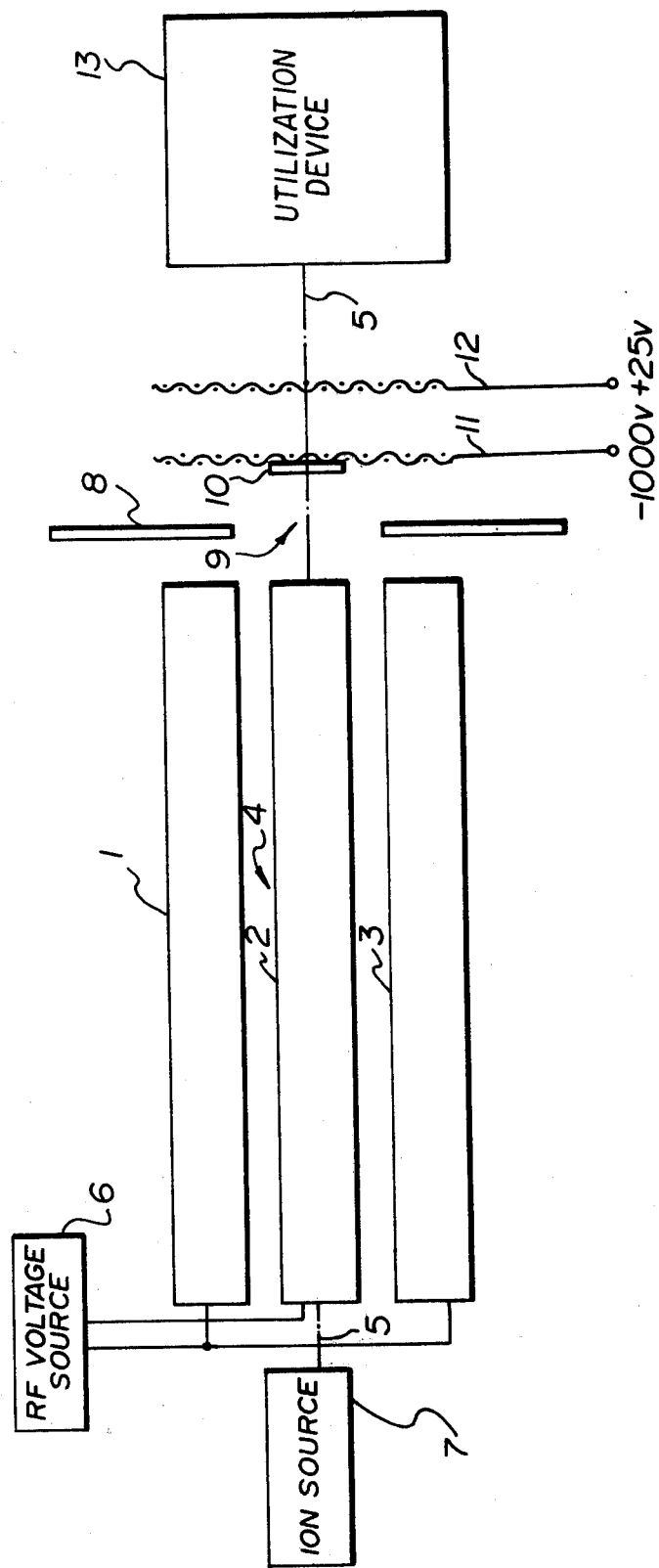
FIG. 1 illustrates the quadrupole mass spectrometer in accordance with this invention.

The quadrupole mass spectrometer includes four poles 1, 2, 3 and 4, poles 1, 2 and 3 which are visible in FIG. 1, while pole 4 is behind pole 2. These poles, as in conventional devices, are positioned symmetrically about the charged particle injection axis 5. Opposite pairs of poles, 1 with 3, and 2 with 4, are interconnected and connected to an rf voltage source 6 to energize the spectrometer. The particles or ions to be analysed are injected along the axis 5 from some predetermined source 7.

Eluding the influence of the rf field, the heavy ions move substantially along the axis 5 while the low mass ions are lost or ejected through the sides of the spectrometer. The remaining ions leave the spectrometer travelling at some angle and distance from the axis 5 without colliding with the poles 1, 2, 3 or 4, or an output shield 8. The shield 8 has a predetermined sized aperture 9 which is usually circular about the axis 5. The diameter of the aperture 9 in shield 8 may best be approximately equal to the diameter of the maximum circle incribed between the four poles 1, 2, 3 and 4.

In accordance with the present invention, a central stop element 10, also preferrably circular is positioned on the axis 5 at the output of the spectrometer. The stop element 10 assures that the heaviest ions travelling mainly along the axis 5 are absorbed, and reduces background signals. The diameter of the stop element 10 may be approximately equal to the diameter of the aperture 9, and the stop element 10 is preferably positioned at approximately three diameters from the shield 8.

The spectrometer further includes at least a pair of grids 11 and 12 through which the remaining ions from the spectrometer will flow. The first grid 11 is connected to a negative voltage so as to accelerate the ions so as to minimize the time the ions spend in the exit fringing field of the quadrupole and to accelerate unwanted heavy ions towards the central stop 10. The second grid 12 may be connected to a positive voltage, or to ground, in order to decelerate the remaining ions before they are directed to a utilization device 13 which might be a detector such as an electron multiplier or which might be a second or tandem quadrupole spectrometer.

For simplicity of construction, stop element 10 may be attached at either grid 11 or 12. The grids are preferably fabricated from a very high transparency mesh in order to minimize obstruction to the passage of the ion beam. However, it is evident to those skilled in the art that cylindrical lenses might also be used as a type of grid. p The ion mass is scanned by varying the magnitude of the rf voltage from source 6. The voltages on the grids 11 and 12 may be fixed at −1000 volts and +25 volts respectively. The measured ions which are marginally stable in the quadrupole field are distinguished because of their distributions of positions and angles at the ion exit rather than because of their axial energies as in the devices of Brinkmann and Holme et al, described above.

Figure 2:
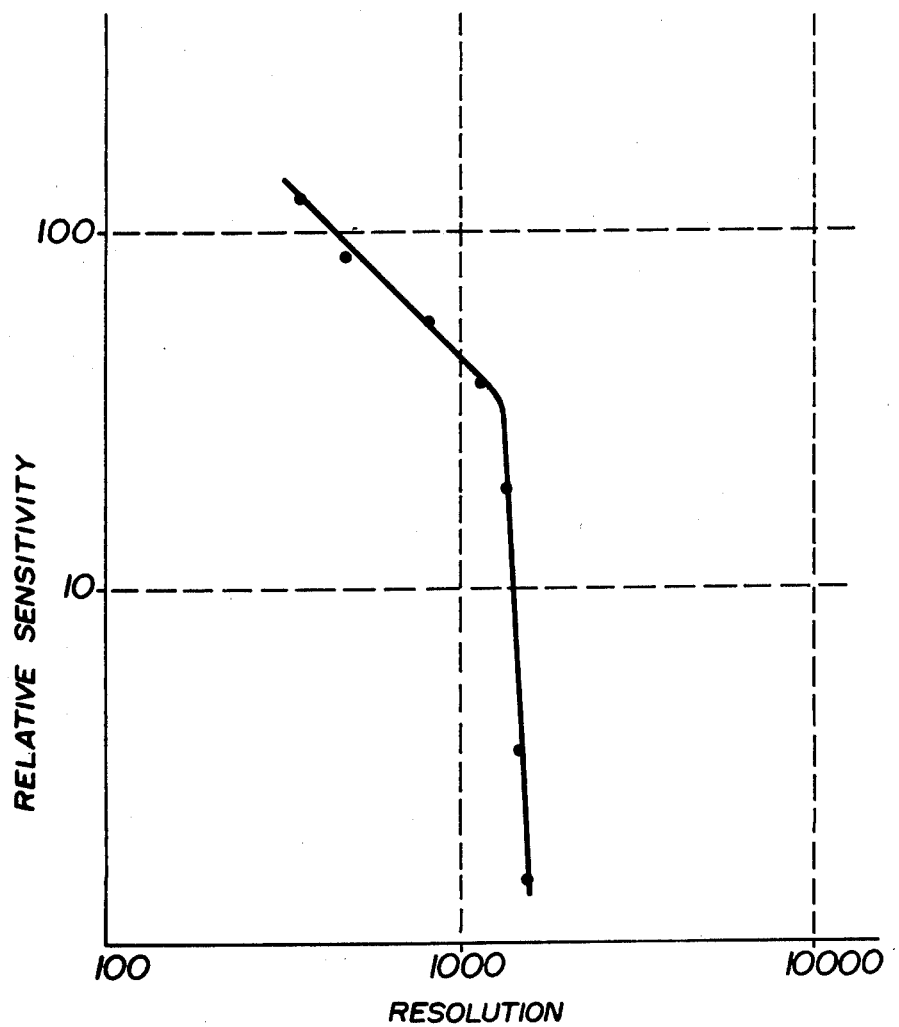
FIG. 2 shows measurements of relative sensitivity versus resolution at half peak height for xenon ions of mass 134 amu.

FIG. 2 shows measurements of relative sensitivity versus resolution at half peak height for xenon ions of mass 134 amu with a quadrupole of length 15 cm and diameter 0.62 cm operating at a radiofrequency of 3.3 MHz. The resolution is varied by changing the axial ion energy. The limit to the observed resolution (∼1500) is more than five times greater than the maximum resolution attainable with the same device operating in the normal manner of the quadrupole mass filter.

Figure 3:
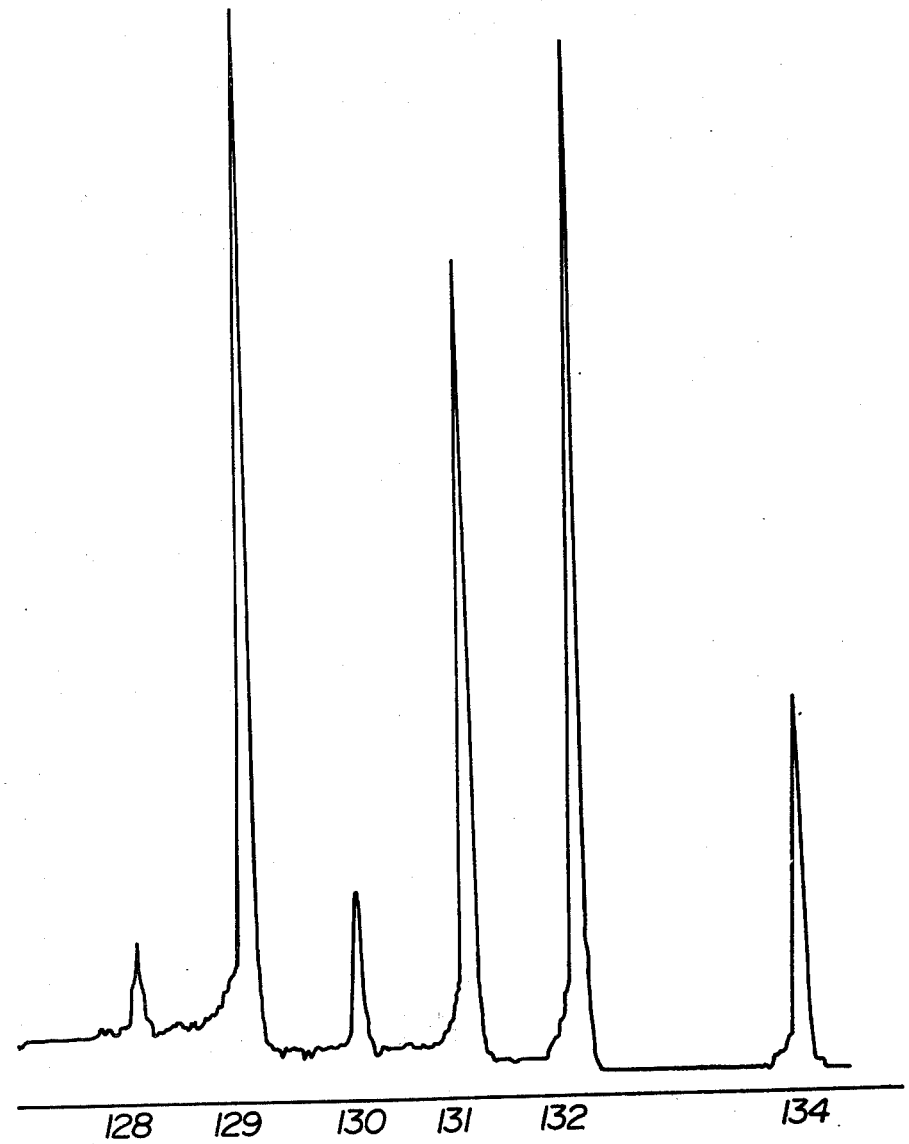
FIG. 3 shows a mass spectrum of the xenon isotopes obtained with a device in accordance with the present invention.

FIG. 3 is the mass spectrum of the xenon isotopes obtained by apparatus in accordance with the present invention.

I claim:

1. A quadrupole mass spectrometer for charged particles comprising:
    four rod-shaped poles positioned symmetrically in parallel about an axis along which charged particles are injected from one end of the poles, opposite pairs of the poles being interconnected and adapted for connection to an rf voltage source; and
    first and second grid means located sequentially at the other end of said poles along the axis, the first grid means being adapted to receive a dc potential for accelerating particles leaving the poles and the second grid means being adapted to receive a dc potential for decelerating the particles passing through the first grid.

2. A quadrupole mass spectrometer as claimed in claim 1 wherein each of the first and second grid means consists of a high transparency mesh for connection to a dc voltage source.

3. A quadrupole mass spectrometer as claimed in claim 1 which further includes a mass of material located on the axis at the other end of the poles to stop particles travelling along the axis.

4. A quadrupole mass spectrometer as claimed in claim 2 which further includes a mass of material attached to the first grid means on the axis for stopping particles travelling along the axis.

5. A quadrupole mass spectrometer as claimed in claim 4 which further includes a shield having a circular aperture located symmetrically about the axis between the other end of the rods and the first grid.

* * * * *